United States Patent [19]

Le et al.

[11] Patent Number: 5,343,324
[45] Date of Patent: Aug. 30, 1994

[54] BIAS CONTROL AND METHOD FOR ELECTRO-OPTIC MODULATORS

[75] Inventors: Phat Le, Anaheim; Xin Cheng, Los Angeles, both of Calif.

[73] Assignee: Amoco Corporation, Chicago, Ill.

[21] Appl. No.: 794,719

[22] Filed: Nov. 15, 1991

[51] Int. Cl.$^5$ ............................................ H04B 10/04
[52] U.S. Cl. ..................................... 359/184; 359/181; 359/187
[58] Field of Search ................ 359/181, 184, 185, 186, 359/187, 245, 264, 153, 161; 455/115, 116, 126

[56] References Cited

U.S. PATENT DOCUMENTS

| | | | |
|---|---|---|---|
| 3,780,296 | 12/1978 | Waksberg et al. | 250/201 |
| 4,071,751 | 1/1978 | Waksberg | 250/201 |
| 4,253,734 | 3/1981 | Komurasaki et al. | 350/386 |
| 4,306,142 | 12/1981 | Watanabe et al. | 250/201 |
| 5,003,624 | 3/1991 | Terbrack et al. | 455/618 |

OTHER PUBLICATIONS

R. H. Buckley, "A rugged twenty kilometer fiber optic link for 2 to 18 gigahertz communications", *SPIE EO/Fiber-90*, San Jose, Calif.

M. G. Lee et al., "New robust bias control method for optical communications," SPIE Proceedings, *Optical and Digital GaAs Technologies for Signal-Processing Applications*, vol. 1291, pp. 55–65, Apr. 1990.

*Primary Examiner*—Richard E. Chilcot, Jr.
*Assistant Examiner*—Rafael Bacares
*Attorney, Agent, or Firm*—Stephen G. Mican

[57] ABSTRACT

An electro-optical modulation system comprising an optical modulator for pulse-modulating an incoming light beam in response to a pulsed RF input signal and to a bias signal and for producing a pulse-modulated optical output which is characterized by a plurality of enveloped pulses, optical detector for producing an electrical signal which is representative of the output from the optical modulator, average detecting device for producing pulse envelope signals which are representative of the envelopes of the pulses, and a bias control circuit, using a plurality of pulse envelop signals, for producing the bias signal as a function of the pulse envelopes.

12 Claims, 3 Drawing Sheets

BIAS CONTROL AND METHOD FOR ELECTRO-OPTIC MODULATORS

TECHNICAL FIELD

This invention relates to the general subject of optical communications and, in particular to optical modulators and their control.

BACKGROUND OF THE INVENTION

One of the major methods of obtaining an intensity-modulated light signal is external modulation. Several types of external modulators can serve this purpose. Currently, the most highly developed external modulators are integrated electro-optic modulators using Lithium Niobate (LiNbO$_3$) crystawl (e.g., a Mach-Zehnder modulator). With these modulators efficient light intensity modulation can be obtained by an applied voltage.

FIG. 1 shows a typical setup for measuring the optical response (i.e., the transfer curve) of such an electro-optic modulator as a function of the applied voltage. A CW laser light source (i.e., a carrier lighyt beam) with controlled polarization is coupled to a modulator using a polarization-maintaining (PM) optical fiber. As the applied bias voltage is swept, the optical response is measured using an optical power meter. A typical plot of the modulator transfer curve or function shows an optical response versus applied voltage characteristic which is sinusoidal and which has a short linear portion intermediate its ends (FIGS. 2A, 2B and 2C). For most linear analog applications, the input signal is imposed in this linear region. In order to achieve this, a DC bias voltage is applied to the modulator so that the DC optical response is about half-way between the minimum and the maximum ends of the curve. As shown by the left-hand portion of FIG. 2A, when an input signal (e.g., a high data rate signal, a data stream of bits, a radio frequency (RF) signal or an electric field signal derived from an electric field sensor) is applied to a modulator which is biased at the normal operating point or bias point, an output siganl with lowest harmonic distortion and intermodulation would result under ideal conditions.

Drift or variation in the bias point of LiNbO$_3$ modulating devices is a serious problem which prevents stable operation. Three main types of bias drift are: bias variation due to temperature changes and the pyro-electric effect; slow drift caused by variations in the DC voltage applied to the set bias point; and optical damage due to the photo-refractive effect causing bias point changes. In order to maintain the modulator at its optimum operating point, these variations in the bias point must be compensated by varying the applied bias voltage.

FIGS. 2A, 2B, and 2C illustrate three different bias conditions. In FIG. 2A, the bias $B_1$ is at the normal center point along the transfer curve. At this normal bias, a sinusoidal modulation signal superimposed on the bias voltage will result in a modulated optical output siganl with minimum distortion. FIG. 2B shows the condition in which the bias voltage $B_2$ is displaced to a higher value, and the output waveform is severely distorted in the upper end. Similarly, FIG. 2C shows the condition in which the bias voltage $B_3$ is displaced to a lower value and results in the optical siganl distortion at the lower end. It is desirable to operated the modulator at the normal bias point in order to maintain the fidelity of the signal.

As illustrated in FIG. 2B, when a pulsed RF signal is applied to the modulator having a bias point $B_2$ in a nonlinear region or portion of the transfer curve, a distorted version of the pulsed RF light signal is obtained. Due to the clipping effect at the upper side, the output waveform is nonsymmetrical with respect to the DC line. This could be experimentally observed with a fast detector capable at the frequency of the RF carrier.

Several methods and control systems have been used to stabilize the bias of an optical modulator (e.g., see U.S. Pat. Nos. 3,780,296 to Waksberg et at.; 3,988,704 to Rice et al.; 4,071,751 to Waksberg; 4,306,142 to Watanabe; 4,253,734 to Komurasaki et al; and 4,977,565 to Shimosaka, and the paper by R. H. Buckley, "A rugged twenty kilometer fiber optic link for 2 to 18 gigahertz communications", *SPIE EO/Fiber-90*, San Jose, Calif.)

One relatively recent straight-forward method is to inject a continuous low-frequency pilot tone through the modulator (See U.S. Pat. No. 5,003,624 to Terbrock et al.) The amplitude of this tone is then detected by a photodiode at a fiber tap on the modulator output. The objective of this method and apparatus is to maintain the constant detected signal by changing the bias voltage accordingly. Due to its simplicity, this method has several drawbacks: the signal injected has to be large in order to be detected efficiently; the sensitivity to biasing drift is low at small signal levels; and the information on the slope of the transfer curve at the bias point is difficult to obtain.

Another methods uses a low frequency bipolar square wave electrically impressed on the modulator. (See M. G. Lee et al., "New robust bias control method for optical communications," SPIE Proceedings, *Optical and Digital GaAs Technologies for Signal-Processing Applications*, Vol. 1291, pages 55–65, April 1990.) At a fiber tap on the modulator output, a positive-going pulse and a negative-going pulse are detected. A control circuit then develops a bias voltage change in response to the amplitude differences between the two pulses. Although this method is more preferred than the previous one, the high amplitude of the low-frequency pulses can interfere with the signals sent by the modulator. The imposition of such a pilot tone results in an operation which inherently departs from the ideal bias point by the amount of the pulse amplitude. Therefore, the level of the pilot tone has to be kept at a low level to minimally disturb to the bias point.

Thus, there is need for a bias control means which can develop a bias voltage for an optical modulator and which overcomes the short-comings of the prior art.

SUMMARY OF THE INVENTION

A general object of the invention is to provide a bias control circuit for producing a bias signal for an optical modulator.

Another objective of the invention is to provide a circuit for converting the pulse-modulated RF optical output of an optical modulator into a bias signal which is a function of the symmetry of the RF pulses.

Still another object of the invention is to provide a system for modulating an incoming light beam in response to the operation of an optical detector which has a slow time response.

One specific object of the invention is to provide an apparatus and method for controlling the drift of the operating point in an optical modulator due to the pyro-electric effect and the photo-refractive effect.

In accordance with the present invention, claim is made of an electro-optical modulation system comprising: optical modulator means for pulse-modulating an incoming carrier light beamin response to a pulsed RF input signal and a bias signal and for producing a pulse-modulated optical output which is characterized by a plurality of enveloped pulses; optical detector means, using said pulse-modulated optical output from said optical modulator means, for producing an electrical signal which is representative of said output from said optical modulator means; signal producing means, using said electrical signal from said optical detector means, for producing pulse envelope signals which are representative of said envelopes of said pulses; and a bias control circuit, using said pulse envelope signals, for producing said bias signal as a function of said pulse envelopes.

The approach taken by the inventin in solving the problem of bias control in an electro-optical modulation system is simple and effective; it also offers the flexibility to maintain constant bias along any point on the transfer curve for other applications. For example, when the modulator is used as a frequency doubler, this can simply be done by maintaining the detected pulse at a certain amplitude and direction.

Numerous other advantages and features of the present invention will become readily apparent from te following detailed description of the invention, the embodiments described therein, from the claims, and from the accompanying drawings.

DETAILED DESCRIPTION

While this invention is susceptible of embodiment in many different forms, there is shown in th drawings, and will herein be described in detail, one specific embodiment of the invention. It should be understood, however, that the present disclosure is to be considered an exemplification of the principles of the invention and is not intended to limit the invention ot the specific embodiment illustrated.

Basic Concept

Figure 2A:
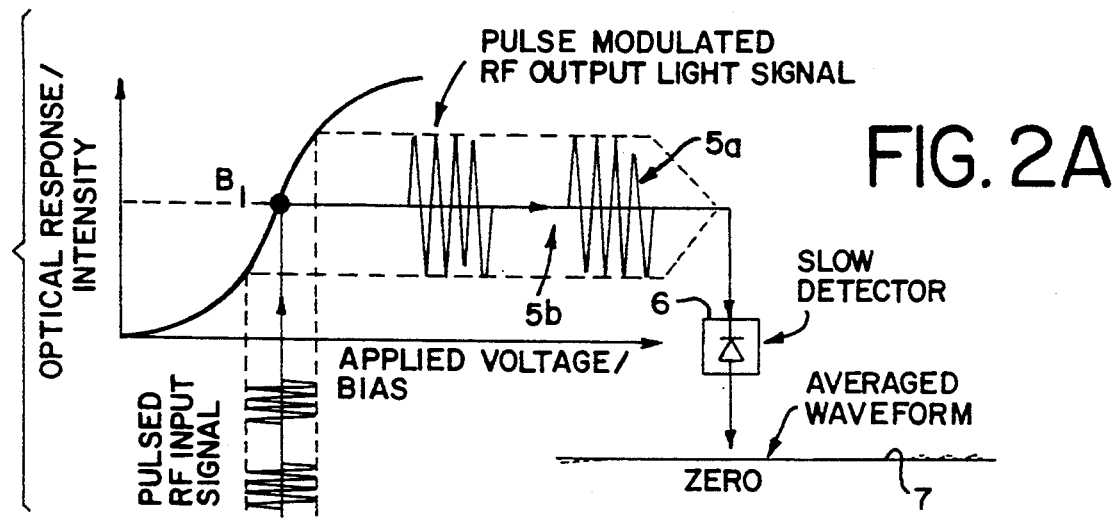
FIGS. 2A, 2B and 2C illustrate the effects of changes in the bias point at which an optical modulator is operated and the basic concept of the present invention.
Figure 2B:
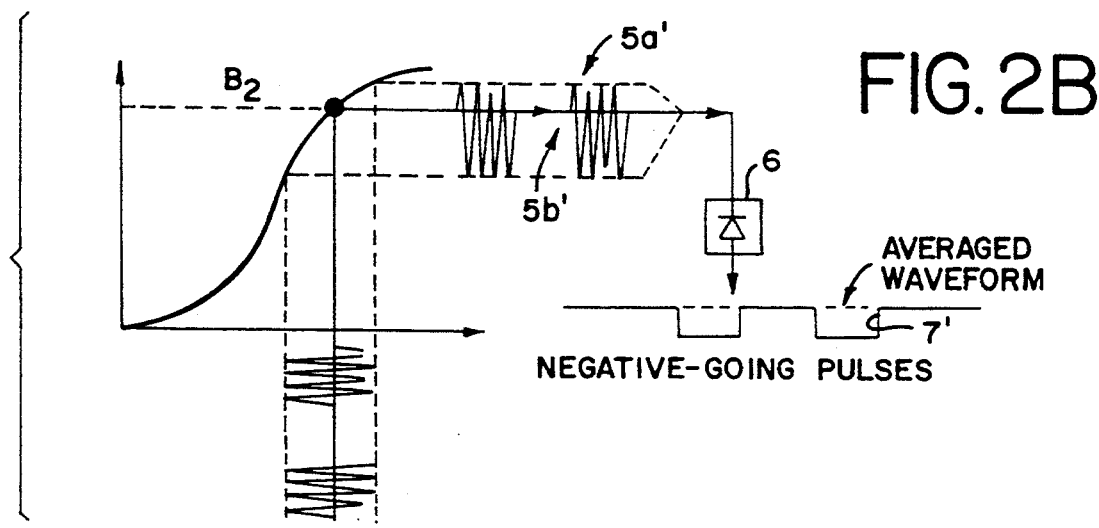
Figure 2C:
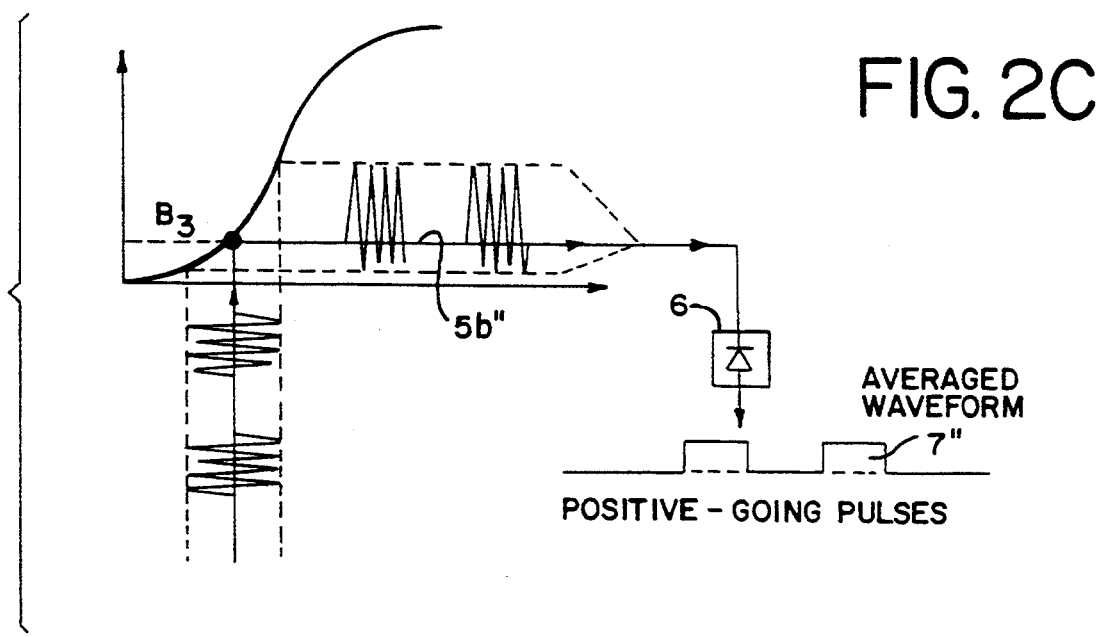

Before describing the components of the invention, the basic concept on which the invention is based will be described. As shown in FIGS. 2A, 2B and 2C, a train of symmetrical RF pulses is superimposed on the bias voltage to produce the output signals for three different conditions of bias. It will be observed that when the bias is at the normal operating point $B_1$, as shown in FIG. 2A, the optical output signal contains a train of symmetrical RF pulses 5. If this output signal is detected by a photodetector 6 and filtered through a low-pass filter, which blocks out the RF component and allows the pulse compoonent to pass through, a waveform 7 of zero pulse amplitude will be obtained, as shown on the right side of the figure. The effect of the low-pass filter is to produce the "average value" of the high frequency signal 5. In FIG. 2A, zero pulse amplitude is obtained because the average value during the on-cycle $5a$ of the pulse is equal to the average value during the of-cycle $5b$ of the pulse.

However, if the bias changes (e.g., dur to drifting, etc) to a higher value $B_2$ as shown in FIG. 2B, the optical output signal would contain a train of asymmetrical RF pulses (while the input signal remains symmetrical) having a flatter response at their upper end $5a'$. The average waveform $7'$ derived from this train of asymmetrical RF pulses will be a train of negative-going pulses as shown on the right side of the figure. A negative-going pulse is obtained because the average value during the on-cycle $5a'$ of the pulse is lower than the average value during the off-cycle $5b'$ of the pulse.

Similarly, FIG. 2C shows the condition which results in a train of positive-going pulses $7''$ for the averaged waveform. Thus, the averaged pulse waveform can be used as a feedback signal to give information about the bias point. In particular, the strength or magnitude of the amplitude indicates the degree of deviation from the normal bias, and the direction of the pulse indicates the slope of the transfer curve.

Apparatus and Method

Figure 3:
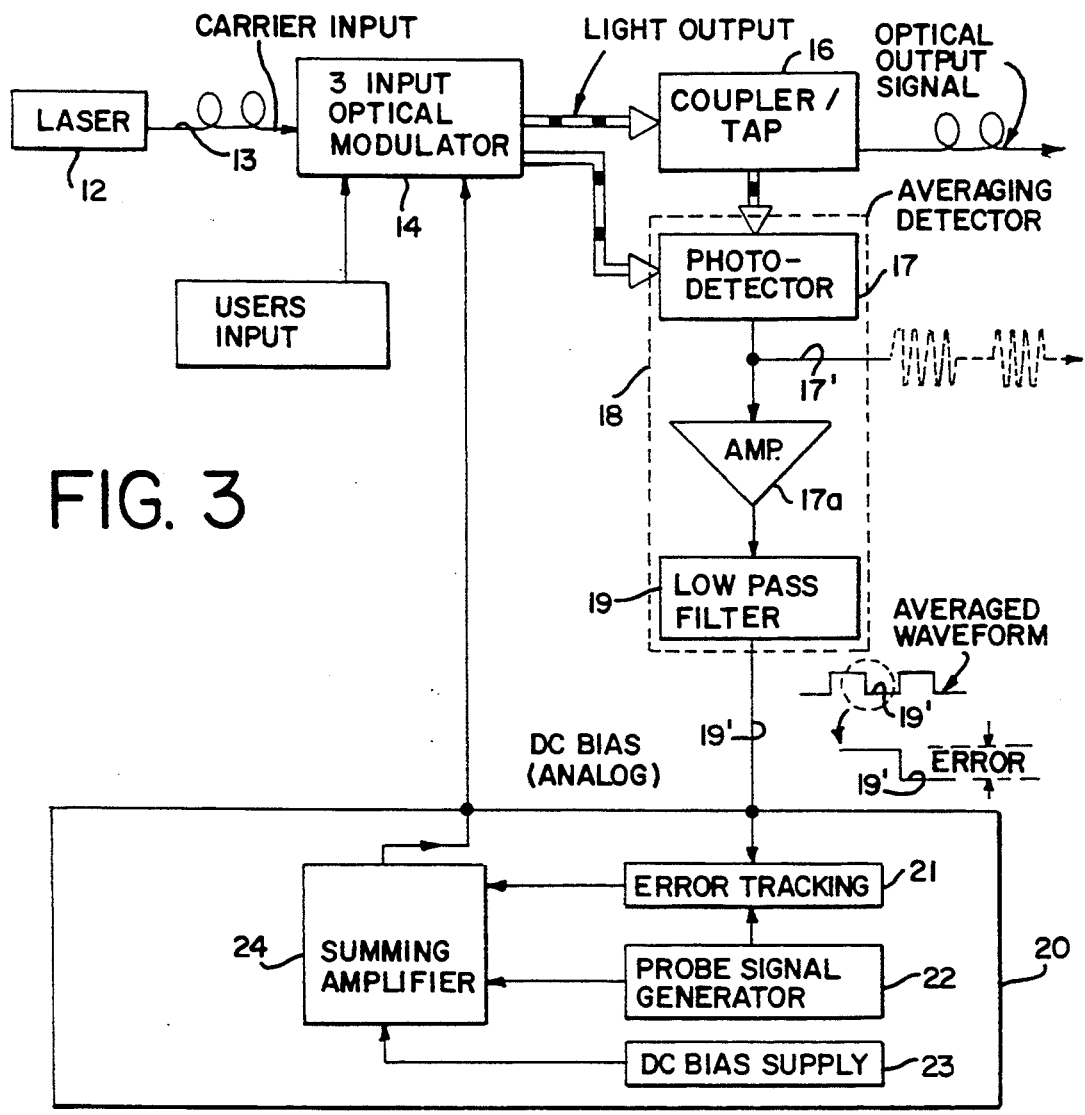
FIG. 3 is a block diagram of the bias control system that is the subject of the present invention.
Figure 3A:
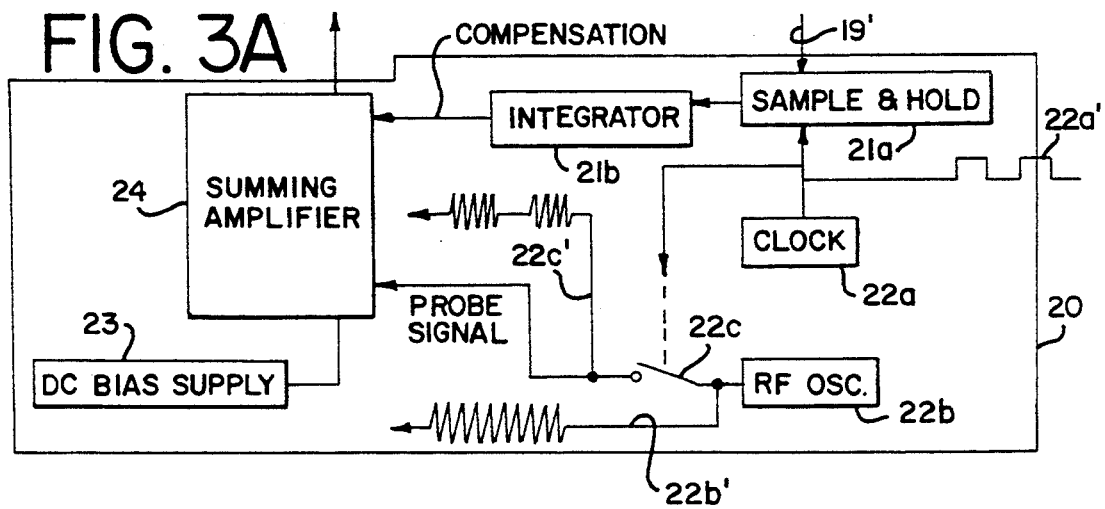

Turning to FIG. 3, there is shown a block diagram of a modulation system 10 which incorporates the present invention. The basic components are: a laser light source 12, an Optical Modulator 14, an Optical Signal Coupler or tap 16 at the output of the Modulator, an Averaging Detector 18, and a Bias Controller 20. The output of the laser source 12 is sent to the Modulator 14 by means of a fiber optic cable 13. A portion of the modulated optical output of the Modulator 14 is sent by the Optical Signal Coupler 16 to the Averaging Detector 18.

In one particular embodiment, the Modulator 14 was a Mach-Zehnder Optical Modulator made by Crystal Technology of California and the laser source 12 was an Amoco Laser Company diode pumped Nd:YAG laser.

By way of specific example, the laser light source 12 comprises a Neodymium-doped YAG (Nd:YAG) lasant mateial in combination with an optical pumping means having a wavelength of about 808 nm. When pumped with light of this wavelength, Nd:YAG emits light having a wavelength of either about 1064 nm or about 1319 nm. Suitable optical pumping means include, but are not limited to, laser diodes, light-emitting diodes (includig superluminescent diodes and superluminescent diode arrays) and laser diode arrays, together with any ancillary packaging or structures. For the purposes hereof, the term "optical pumping means" includes any heat sink, thermoelectric cooler or packaging associated with said laser diodes, light-emitting diodes and laser diode arrays.

The Averaging Detector 18 comprises a photodetector 17, an AC-coupled amplifier 17a, and a low-pass filter 19. The photodetector 17 (e.g., one made by Epitaxx of New Jersey) converts a portion of the optical signal out of the Modulator 14 into an electrical signal $17'$. Before being input to the low-pass filter 19, this signal is amplified by the AC-coupled amplifier 17a which blocks out the DC component so that the DC level is translated to zero at the output.

The electrical signal from photodetector 17 is filtered through the low-pass filter 19 with an upper corner frequency of a few KHz to allow the pulse component to pass through. This "filtered" waveform is an input to the Bias Controller 20.

The Averaging Detector 18 needs only to be capable of detecting the rate of the applied optical pulse. As was previously explained, because the Averaging Detector 18 is not responsive to the frequency of the RF carrier, the RF carrier in the output light signal is "averaged out" (i.e., equivalent to integration). Consequently, the output from Averaging Detector 18 preserves only the pulse envelope waveform 7, 7' or 7'' (shown on the right-hand side of FIGS. 2A, 2B and 2C) of the pulse modulated RF output light signal. This pulse envelope waveform could be either positive-going 7'' (i.e., see FIG. 2C) or negative-going 7' (i.e., see FIG. 2B) depending on the actual bias point $B_2$ or $B_3$ with respect with the center or normal bias point $B_1$. If the Modulator 14 is biased at the center or normal bias point $B_1$, a flat waveform 7 (see FIG. 2A), without a distinctive pulse envelope, would be observed; this is because the modulated light signal is symmetrical with an average equal to the DC line voltage.

The key point is the "averageing effect" of the Averaging Detector 18 as a means to indicate the actual location of the bias point on the transfer curve.

The Bias Controller 20 analyzes the amplitude and direction of the filtered waveform 19' from the Averaging Detector 18 and outputs an appropriate DC compensation and bias signal 41 for the Modulator 14. In this particular embodiment, the Bias controller comprises an Error Tracking Circuit 21, a Probe Signal Generator 22, a fixed DC Bias Supply 23, and a summing amplifier 24.

the Error Tracking circuit 21 comprises a sample-and-hold device 21a whose function is to capture and memorize the pulse amplitude of the filtered waveform 19' from the low-pass filter 19. The value of the pulse amplitude of the waveform 19' is measured during its on-cycle and kept constant during its off-cycle. A clock 22a provides a signal which is used to drive the sample-and-hold device 21a to its on-cycle and its off-cycle. The measured pulse amplitude is used as an indication of bias error. As explained earlier, the bias error is proprotional to the height of the pulse amplitude. The sign (positive and negative) of the pulse amplitude indicates the slope of the transfer curve where the bias point is situated. During the off-cycle the integrator 21b integrates the error signal over a period equal to the off-sycle, and provides as an output a bias compensation signal to the Summing Amplifier 24.

The Probe Signal Generator 22 comprises a clock 22a, a Switch 2222c and an RF Oscillator 22b. The clock Generator 22a generates a pulse waveform 22a' which is used to drive both the Swtich 22c and the sample-and-hold device 21a. When the pulse 22a' is high (i.e., on-cycle) the Switch is turned "on" which allows the continuous RF signal 22b from Oscillator 22b to pass through the Summing Amplifier 24. When the pulse 22a is low (i.e., off-cycle) the Switch 22c is turned "off". Thus, a pulsed RF waveform 22c' appears at the output of the Switch 22c. This waveform 22c', which consists of a train of symmetrical Rf pulses, serves as a "probe signal" and is injected to the Modulator 14 for the purpose of locating the bias point and deriving an error signal. sicne the pattern and the timing of the probe signal are synchronized with the error tracking circuit 21 through the clock signal 22a', the Modulator's response corresponding to the probe signal can be detected separtely and analyzed for bias error by the Error Tracking circuit 21 regardless of the presence of user's input signal (e.g., the user's input signal can be a random unknonw, with respect to the error tracking circuit, or a non-continuous Rf signal).

Because the probe signal utilizes a pulse-modulated RF carrier which is effectively one of the signal channels in a subcarrier modulationi (SCM) system, the bias point is not disturbed, unlike the prior art, when the pulse is applied, for the purpose of locating the bias point. those skilled in the art will recognize this as a very desirable feature. Still another advantage of the present invention is that the amplitude of the RF signal can be small so that interference can be minimized. Also, the frequency of the pulsed RF signal can be chosen arbitrarily within the bandwidth of the system tyo minimize intermodulation with user's signals. In one prototype of the invention the system can accommodate a range Rf carrier from a few hundred KHz to a few GHz. The carrier frequency chosen for the probe signal in this system was 600 KHz.

The summing Amplifier 24 combines a DC bias voltage from DC Bias Supply 23, the probe signal from Probe signal Generator 22, and the bias compensation signal from Error Tracking Circuit 21. The combined signal is fed to the Optical Modulator 14. It is clear that the bias voltage to Optical Modulator 14 is adjusted accordingly to the bias compensation signal. If the bias compensation signal is positive this signal is added to the DC bias voltage from the Dc bias supply 23 by the Summing Amplifier 24. Similarly, if the compensatino signal is negative, it is substracted. Thus, if an error signal is sensed, the Bias Controller 20 will automatically adjust the bias voltage.

Figure 1:
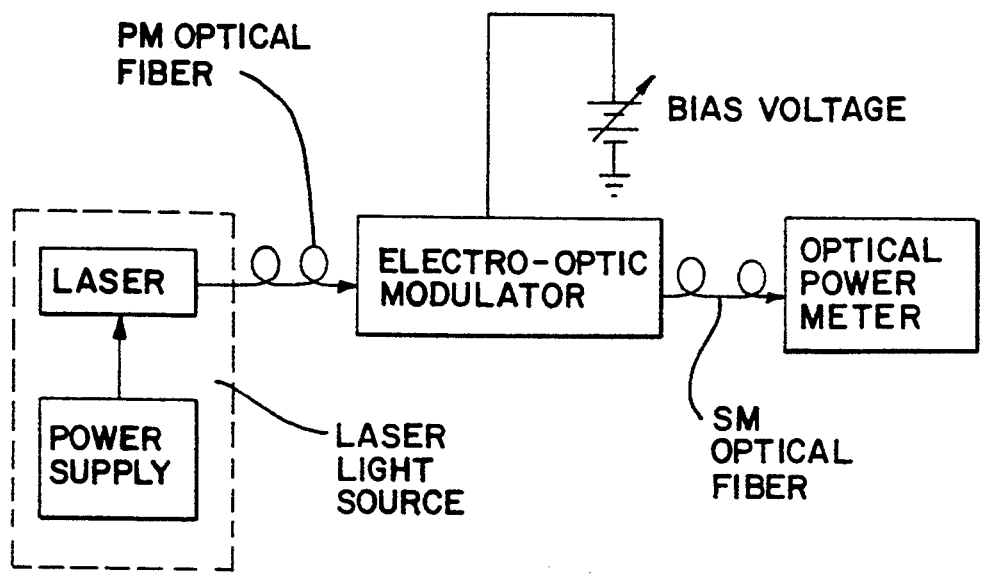
FIG. 1 is a schematic diagram of one means by which the transfer curve of an optical modulator is obtained.
Figure 4:
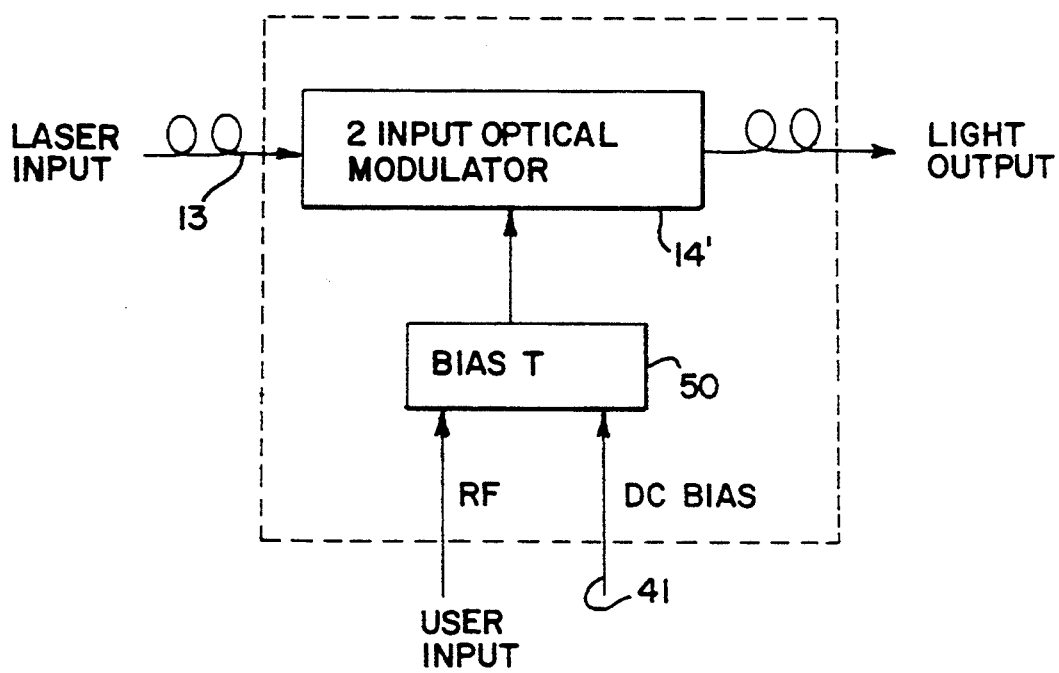
FIG. 4 is a block digram of a two-input optical modulator.

From The foregoing description, it will be observed that numerous variations, alternatives and modifications will be apparent to those skilled in the art. Accordingly, this description is to be construed as illustrative only and is for the prupose of teaching those skilled in the art the manner of carrying out the invention. Various changes may be made, materials substituted and features of the invention utilized. for example, AC coupling of signal 17' for translating the DC level to zero is not needed if a more complicated error tracking circuit capable of measuring both the pulse height and the DC level is implemented. Similarly, although FIG. 3 illustrates the invention when a 3-input Optical Modulator 14 is used, the Bias Controller 20 can be also used with a 2-input Optical Moddulator 14' as depicted in FIG. 4. The DC bias signal 41 and the RF output of the combiner are mixed together using a Bias-Tee 50. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

That which is claimed is:

1. An electro-optical modulation system that comprises:

2. The system of claim 1, wherein said probe signal generator comprises an RF oscillator, a clock and a switch which is opened and closed by said clock, which receives the output of said RF oscillator and which has said RF signal as an output.

3. The system of claim 2, wherein said error tracking means comprises:

a sample and hold device which receives said pulse envelope signals from said signal producing means, which is gated between an on-cycle and an off-cycle by said clock, and which measures the pulse amplitude of a pulse envelope signal when turned on by said clock; and integrating means, operating during said off-cycle, for integrating said measured pulse amplitude from said sample and hold device and producing said DC error signal.

4. An electro-optical modulation system that comprises:
- optical modulator means for pulse-modulating an incoming carrier light beam in response to a pulsed RF input signal and a bias signal to produce a pulse-modulated optical output that is characterized by a plurality of enveloped pulses;
- optical detector means for converting a portion of said pulse-modulated optical output from said output modulator means to an electrical signal that is representative of said output from said output modulator means;
- signal filtering means for converting said electrical signal from said optical detector means to pulse envelope signals that are representative of said envelopes of said pulses by averaging said electrical signal over the period of said pulse envelopes; and
- a bias control circuit for converting said pulse envelopes signals to said bias signal as a function of said pulse envelopes.

5. In an optical modulator that pulse modulates an incoming laser light beam in response to a pulsed RF input signal and a DC bias input signal to produce a pulse-modulated optical output characterized by a plurality of pulse envelopes, and which has a transfer curve that includes a linear portion that is bonded by a maximum value and a minimum value and nonlinear portions adjacent to said maximum value and said minimum value, apparatus that comprises:
- averaging means for converting a pulse-modulated optical output to an electrical signal that is representative of the average of said pulse-modulated optical output that comprises:
  - a photodetector for converting said pulse-modulated optical output to an electrical output; and
  - low-pass filter means, receiving said electrical output, for producing said electrical signal; and
- a controller for producing from said electrical signal a DC bias input signal that is a function of at least one of the amplitude of said average, the direction of said average, and the symetry of said average of said pulse-modulated optical output that comprises a DC bias supply and a summing amplifier for combining at least the output of said DC bias supply and a signal that is a function of said electrical signal.

6. The apparatus of claim 5, wherein said controller further includes an oscillator for producing an RF signal, a clock, and a switch which is opened and closed by said clock and which applies said RF signal from said oscillator to said summing amplifier.

7. An electro-optical modulation system that comprises:
- a Mach-Zehnder modulator for modulating an incoming light beam in response to a pulsed modulation signal from an RF source and a bias signal to produce a pulse-modulated optical output signal that is characerized by a plurality of pulse envelopes;
- detector means, having a slow time response relative to said pulse-modulated optical output signal and using said pulse-modulated optical output from said optical modulator means, for producing control signal that are a function of said pulse envelopes that comprises:
  - a photodetector for converting said pulse-modulated optical output into a electrical signal; and
  - low-pass filter means for producing, from said electrical signal, said control signal that is representative of said pulse envelopes; and
- a bias controller, using said control signals, for producing said bias signal as a function of the level of said control signals and the algebraic sign of said control signals that comprises: sample and hold means for capturing and measuring the amplitude of said pulse envelopes; a DC bias supply; and a signal amplifier that receives as inputs signals from said DC bias supply and from said sample and hold means and that has said bias signal as an output.

8. The system of claim 7, wherein said bias controller further comprises: a clock for gating said sample and hold means between an on-cycle and an off-cycle; and an RF oscillator having an output which is gated on and off by said clock and which is sent as an input to said signal amplifier.

9. In an optical modulator that, in response to an RF signal input and a DC bias signal input, produces a pulse modulated optical output that is characterized by a series of pulse envelopes, a metho for controlling the modulation of an incoming light beams that comprises the steps of:
- converting said pulse-modulated optical output from an optical modulator to an electrical signal that is representative of said pulse-modified optical output;
- sending said electrical signal to a low-pass filter that has a slow time response relative to said pulsed RF input carrier;
- converting the output of said low pass filter to a DC bias signal as a function of at least one of the amplitude of said series of pulse envelopes and the sign of said series of said pulse envelope by sending said output of said low-pass filter to a sample and hold circuit that is operated by a clock that has an on-cycle for capturing the magnitude of said output from said low-pass filter and that has an off-cycle and integrating said magnitude during said off-cycle of said sample and hold circuit; and
- coupling said DC bias signal to said optical modulator.

10. The method of claim 9, wherein the step of converting the output of said low-pass filter further comprises the steps of:
- using said clock to supply an RF oscillator output during said on-cycle; and
- summing said clocked RF oscillator output and said integrated magnitude of said output from said low-pass filter.

11. In an optical communications system that comprises a laser light source, an optical modulator that receives said laser light and that, in response to an information signal input and a DC bias signal input, produces a pulse-modulated optical output that is characterized by a series of pulse envelopes, and an optical fiber that joins said modulator output to a receiver, a method for controlling said optical modulator that comprises the steps of:

converting said pulse-modulated optical output from said optical modulator to an electrical signal that is representative of said pulse-modualted optical output;

sending said electrical signal to a low-pass filter that has a slow time response relative to the frequency of said information signal;

converting the output of said low-pass filter to a DC bias signal as a function of the amplitude of said series of pulse envelopes and the sigh of said series of said pulse envelopes by sending said output of said low-pass filter to a sample and hold circuit that is operated by a clock that has an on-cycle for capturing the magnitude of said output from said low-pass filter and that has an off-cycle and integrating said magnitude during said off-cycle of said sample and hold circuit; and coupling said DC bias signal to said optical modulator.

12. The method of claim 11, wherein the step of converting the output of said low-pass filter further comprises the steps of:

using said clock to supply an RF oscillator output during said on-cycle; and summing said clocked RF oscillator output and said integrated magnitude of said output from said low-pass filter.

* * * * *

UNITED STATES PATENT AND TRADEMARK OFFICE
CERTIFICATE OF CORRECTION

PATENT NO. : 5,343,324
INVENTOR(S) : Phat Le, et. al.
DATED : August 30, 1994

It is certified that error appears in the above-identified patent and that said Letters Patent is hereby corrected as shown below:

Title page, item [57], Abstract, line 11, delete "envelop", insert –envelope–.

Claim 1, after comprises, insert --optical modulator means for pulse-modulating an incoming carrier light beam in response to a pulsed RF input signal and a bias signal to produce a pulse-modulated optical output that is characterized by a plurality of enveloped pulses;

optical detector means for converting a portion of said pulse-modulated optical output from said optical modulator means to an electrical signal that is representative of said output from said optical modulator means;

signal filtering means for converting said electrical signal from said optical detector means to pulse envelope signals that are representative of said envelopes of said pulses; and a bias control circuit for converting said pulse envelope signals to said bias signal as a function of said pulse envelopes that comprises:

error tracking means, receiving said pulse envelope signal, for providing a DC error signal whose magnitude is a function of the amplitude of said pulse envelope signals over the duration of each of said enveloped pulses;

a probe signal generator for producing a RF signal over the duration of each of said enveloped pulses;

UNITED STATES PATENT AND TRADEMARK OFFICE
CERTIFICATE OF CORRECTION

PATENT NO.   : 5,343,324
INVENTOR(S)  : Phat Le, et. al.
DATED        : August 30, 1994

It is certified that error appears in the above-identified patent and that said Letters Patent is hereby corrected as shown below:

a DC bias supply for producing a fixed D signal; and a summing amplifier for summing said DC error signal, said RF signal from said probe signal generator and said fixed DC signal and for producing said bias signal--.

Claim 5, line 36, delete "bonded", insert --bounded--;

line 52, delete "symetry", insert --symmetry--.

Claim 7, (Col. 8), line 1, delete "characerized", insert --characterized--;

line 10, delete "a", insert --an--.

Claim 9, line 34, delete "metho", insert --method--.

Signed and Sealed this

Twenty-fifth Day of May, 1999

Q. TODD DICKINSON

*Attest:*

*Attesting Officer*            *Acting Commissioner of Patents and Trademarks*